United States Patent
Tsujiko et al.

(10) Patent No.: US 9,099,729 B2
(45) Date of Patent: Aug. 4, 2015

(54) ASSEMBLED BATTERY AND MANUFACTURING METHOD OF ASSEMBLED BATTERY

(75) Inventors: Akira Tsujiko, Miyoshi (JP); Michiyuki Ide, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/345,716

(22) PCT Filed: Oct. 6, 2011

(86) PCT No.: PCT/JP2011/073128
§ 371 (c)(1),
(2), (4) Date: Mar. 19, 2014

(87) PCT Pub. No.: WO2013/051138
PCT Pub. Date: Apr. 11, 2013

(65) Prior Publication Data
US 2014/0220421 A1 Aug. 7, 2014

(51) Int. Cl.
*H01M 2/26* (2006.01)
*H01M 10/04* (2006.01)

(52) U.S. Cl.
CPC .......... *H01M 2/266* (2013.01); *H01M 10/0413* (2013.01); *H01M 2220/20* (2013.01); *Y10T 29/49112* (2015.01)

(58) Field of Classification Search
CPC ....... H01M 2/20; H01M 2/202; H01M 2/204; H01M 2/206; H01M 2/208; H01M 2/22; H01M 2/24; H01M 2/26; H01M 2/263; H01M 2/266; H01M 2/28
See application file for complete search history.

(56) References Cited

U.S. PATENT DOCUMENTS

| | | | |
|---|---|---|---|
| 2004/0028999 A1 | 2/2004 | Richard et al. | |
| 2007/0134551 A1 | 6/2007 | Cyr et al. | |
| 2012/0094541 A1* | 4/2012 | Fuller | 439/627 |

FOREIGN PATENT DOCUMENTS

| | | |
|---|---|---|
| JP | A 2005-528741 | 9/2005 |
| JP | A 2009-519565 | 5/2009 |
| WO | WO 2010124562 A1 * | 11/2010 |

* cited by examiner

*Primary Examiner* — Carlos Barcena
(74) *Attorney, Agent, or Firm* — Oliff PLC (57) ABSTRACT

Provided is an assembled battery with which a wasted space can be reduced and having a large energy density. The assembled battery including a first laminated battery provided to a plurality of current collectors, a second laminated battery provided to a plurality of current collectors, and a connecting portion that bundles and connects the plurality of current collectors provided to the first laminated battery and the plurality of current collectors provided to the second laminated battery, wherein the plurality of current collectors provide to the first laminated battery and the plurality of current collectors provided to the second laminated battery are laminated and bundled in the connecting portion, and a lamination direction of the plurality of current collectors in the connecting portion and a lamination direction of the plurality of current collectors in each laminated battery are intersecting with each other.

13 Claims, 9 Drawing Sheets

Fig. 9

ASSEMBLED BATTERY AND MANUFACTURING METHOD OF ASSEMBLED BATTERY

TECHNICAL FIELD

The present invention relates to a connecting structure in a case of connecting a plurality of laminated batteries to make an assembled battery.

BACKGROUND ART

Nowadays, in view of protecting global environment, there is a need of a power source with a high output power and a high capacity to apply to a low-emission vehicle such as electronic vehicle or hybrid vehicle. In a field outside of vehicles, since mobile devices such as information related devices and communication devises are now widely used on a global basis, there is also a need of a power source that can make such mobile devices high-performance.

In a case that a battery such as a lithium battery is used as a power source, especially when the battery is used as a large power source for equipping in a vehicle such as an electronic vehicle or a hybrid vehicle, it is preferable to laminate a plurality of unit cells to make a laminated battery, and further preferable to connect a plurality of laminated batteries to make an assembled battery. In particular, by connecting the plurality of laminated batteries in series, it is possible to obtain a high-powered assembled battery, which is suitable to use as a large power source for equipping in a vehicle.

For example, in Patent Document 1, in an outer periphery of a plurality of unit cells that are laminated, the plurality of unit cells are further laminated to make a battery bundle (laminated battery), then a plurality of battery bundles are connected in series to configure an assembled battery. According to Patent Document 1, it is possible to form a battery bundle easily and in a cost-effective way.

CITATION LIST

Patent Literatures

Patent Document 1: Japanese Patent Application Laid-Open Publication No. 2005-528741

SUMMARY OF THE INVENTION

Problems to be Solved by the Invention

However, in the assembled battery described in Patent Document 1, there are problems that there is a large wasted space around a connecting portion of the laminated batteries, and thus energy density of entire assembled battery is small.

The present invention is made considering the above problems, and an object of the present invention is to provide an assembled battery that can reduce a wasted space around a connecting portion and whereby have a large energy density.

Means for Solving the Problems

In order to solve the above problems, the inventors of the present invention carried out an intensive study, and found out the following. When a plurality of current collectors provided to one laminated battery and a plurality of current collectors provided to another laminated battery are bundled and connected in series, by laminating and bundling the plurality of current collectors in a manner that a laminating direction of the plurality of current collectors in the connecting portion is different from a laminating direction of unit cells in each laminated battery, it is possible to reduce a wasted space around the connecting portion.

The present invention is made based on the above findings. Namely, a first aspect of the present invention is an assembled battery comprising: a first laminated battery having a plurality of current collectors; a second laminated battery having a plurality of current collectors; and a connecting portion that bundles and connects the plurality of current collectors provided to the first laminated battery and the plurality of current collectors provided to the second laminated battery, wherein the plurality of current collectors provided to the first laminated battery and the plurality of current collectors provided to the second laminated battery are laminated to be bundled in the connecting portion, and a lamination direction of the plurality of current collectors in the connecting portion and a lamination direction of the plurality of current collectors in each laminated battery are intersecting with each other.

In the present invention, the term "plurality of current collectors are bundled and connected" refers that the first laminated battery and the second laminated battery are connected in series or in parallel. In view of making a high-powered assembled battery, preferably the first laminated battery and the second laminated battery are bundled in series. For example, by bundling a plurality of cathode current collectors provided to the first laminated battery and a plurality of anode current collectors provided to the second laminated battery, it is possible to connect the first laminated battery and the second laminated battery in series.

The term "laminating direction of the plurality of current collectors in each laminated battery" refers to a lamination direction of the current collectors laminated with a cathode layers and the like, that is, a lamination direction of a unit cell. Therefore, it does not mean that the plurality of current collectors are laminated in each laminated battery having contact with each other.

In the connecting portion according to the first aspect of the present invention, it is preferable that the current collectors provided to the first laminated battery and the current collectors provided to the second laminated battery are laminated alternately. By laminating the current collectors alternately, when an ultrasonic joining is carried out for example, it is possible to strongly join the plurality of current collectors.

In the first aspect of the present invention, it is preferable that a lamination direction of the plurality of current collectors in the connecting portion and a lamination direction of the plurality of current collectors in each laminated battery are substantially intersecting at right angles to each other. This configuration makes it possible to further reduce the wasted space around the connecting portion.

A second aspect of the present invention is a manufacturing method of an assembled battery, the method comprising laminating, bundling, and connecting a plurality of current collectors provided to a first laminated battery and a plurality of current collectors provided to a second laminated battery in a manner that a lamination direction of the plurality of current collectors provided to the first laminated battery and the plurality of current collectors provided to the second laminated battery intersects with a lamination direction of the plurality of current collectors in each laminated battery.

As more specific aspect of the second aspect of the present invention, for example, a method comprising: a connecting step to laminate and bundle the plurality of current collectors provided to the first laminated battery and the plurality of current collectors provided to the second laminated battery to connect in series, thereby obtaining a connecting portion; and an assembling step to assemble the first laminated battery and the second laminated battery such that a lamination direction of the plurality of current collectors in the connecting portion and a lamination direction of the plurality of current collectors in each laminated battery are intersecting with each other can be raised.

In the connecting step according to the second aspect of the present invention, it is preferable to laminate alternately the plurality of the current collectors provided to the first laminated battery and the plurality of current collectors provided to the second laminated battery. By laminating the current collectors alternately, when an ultrasonic joining is carried out for example, it is possible to strongly join the plurality of current collectors.

In the assembling step according to the second aspect of the present invention, it is preferable to make the lamination direction of the plurality of current collectors in the connecting portion and the lamination direction of the plurality of current collectors in each laminated battery substantially intersect at right angle to each other. This configuration makes it possible to further reduce the wasted space around the connecting portion.

Alternatively, having a same effect as that of the first aspect of the present invention, an assembled battery as follows can be made. Namely, a third aspect of the present invention is an assembled battery comprising: a first laminated battery in which a current collector(s) is/are laminated more than once; a second laminated battery in which a current collector(s) is/are laminated more than once; and a connecting portion that bundles and connects the current collector(s) provided to the first laminated battery and the current collector(s) provided to the second laminated battery, wherein the current collector(s) provided to the first laminated battery and the current collector(s) provided to the second laminated battery are laminated and bundled in the connecting portion, and a lamination direction of the current collector(s) in the connecting portion and a lamination direction of the current collector(s) in each laminated battery are intersecting with each other.

Here, the term "a laminated battery in which a current collector(s) is/are laminated more than once" refers to a laminated battery in which a current collector(s) is/are laminated more than once with a cathode layer and the like. This includes a configuration in which one unit cell is wound to laminate the current collector(s) more than once with a cathode layer and the like in a cross sectional shape. That is, a "wound battery" is included in the "laminated battery" referred in the present invention. In this case, when a current collector(s) extending from a first wound battery and a current collector(s) extending from a second wound battery are bundled to configure a connecting portion, a lamination direction of the current collectors in the connecting portion and a lamination direction of the current collectors in each laminated battery can be intersecting with each other.

Effects of the Invention

In the present invention, when a plurality of current collectors provided to one laminated battery and a plurality of current collectors provided to another laminated battery are bundled to be connected in series, the plurality of current collectors are laminated and bundled such that a lamination direction of the current collectors in the connecting portion is different from a lamination direction of unit cells in each laminated battery. This makes it possible to reduce a wasted space around the connecting portion to thereby provide an assembled battery with a large energy density.

MODES FOR CARRYING OUT THE INVENTION

1. Problems of a Conventional Technique

Figure 1:
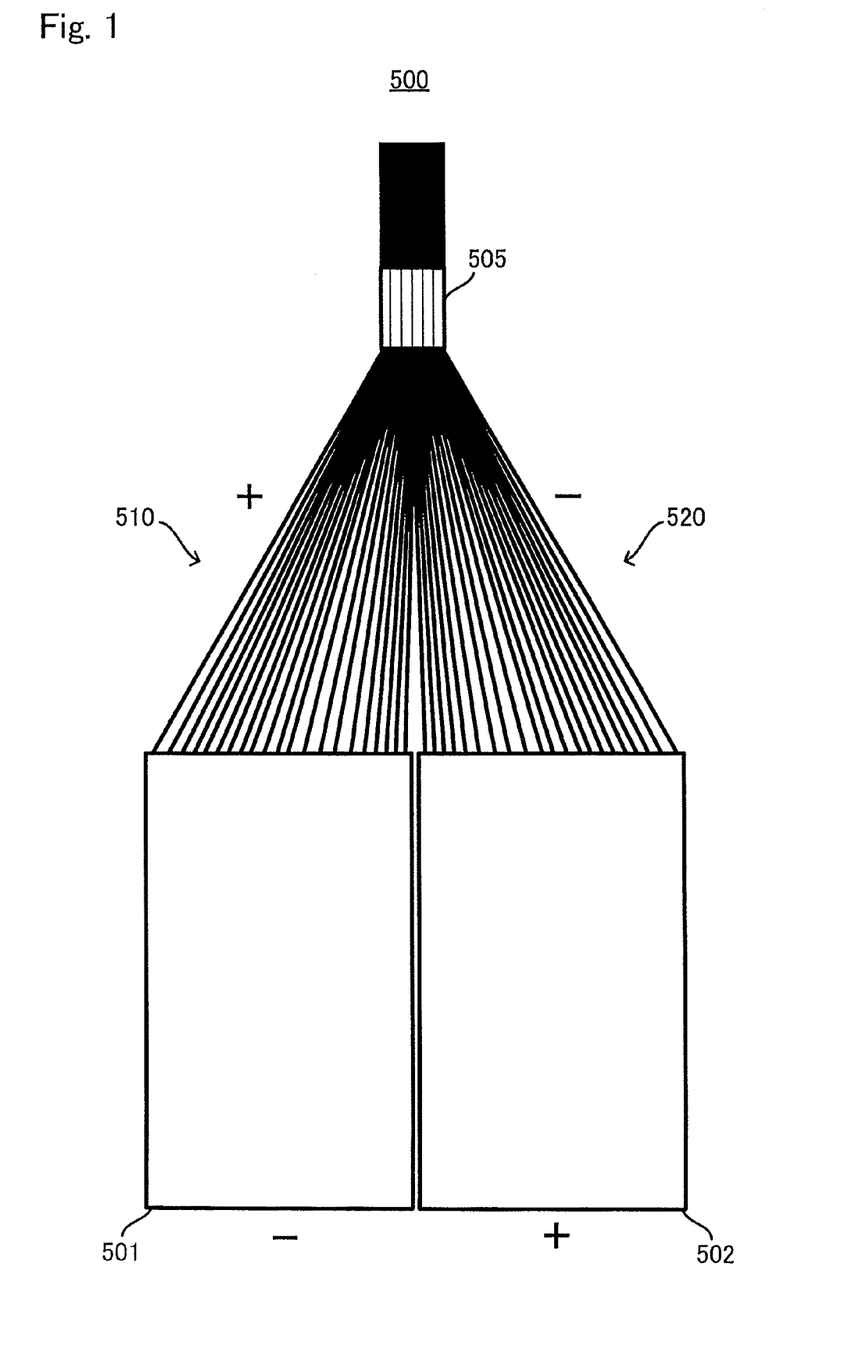
FIG. 1 is a schematic view showing a configuration of an assembled battery according to a conventional example (Comparative Example)

In FIG. 1, an assembled battery 500 in which a plurality of current collectors are bundled to be connected in series is schematically shown. As shown in FIG. 1, the assembled battery 500 comprises; a first laminated battery 501 provided with a plurality of current collectors 510; a second laminated battery 502 provided with a plurality of current collectors 520; and a connecting portion 505 that bundles and connects in series the plurality of current collectors 510 provided to the first laminated battery 501 and the plurality of current collectors 520 provided to the second laminated battery 502.

In the assembled battery 500, the plurality of current collectors 510, 520 are strained from the laminated battery 501, 502 to the connecting portion 505. In particular, current collectors 510a, 520a of the plurality of current collectors 510 and 520, the current collectors 510a, 520a provided to the outmost of the laminated battery, are strongly strained. In the assembled battery 500, there is a long distance between the laminated battery 501, 502 and the connecting portion 505, therefore a wasted space is created around the connecting portion 505.

Figure 2:
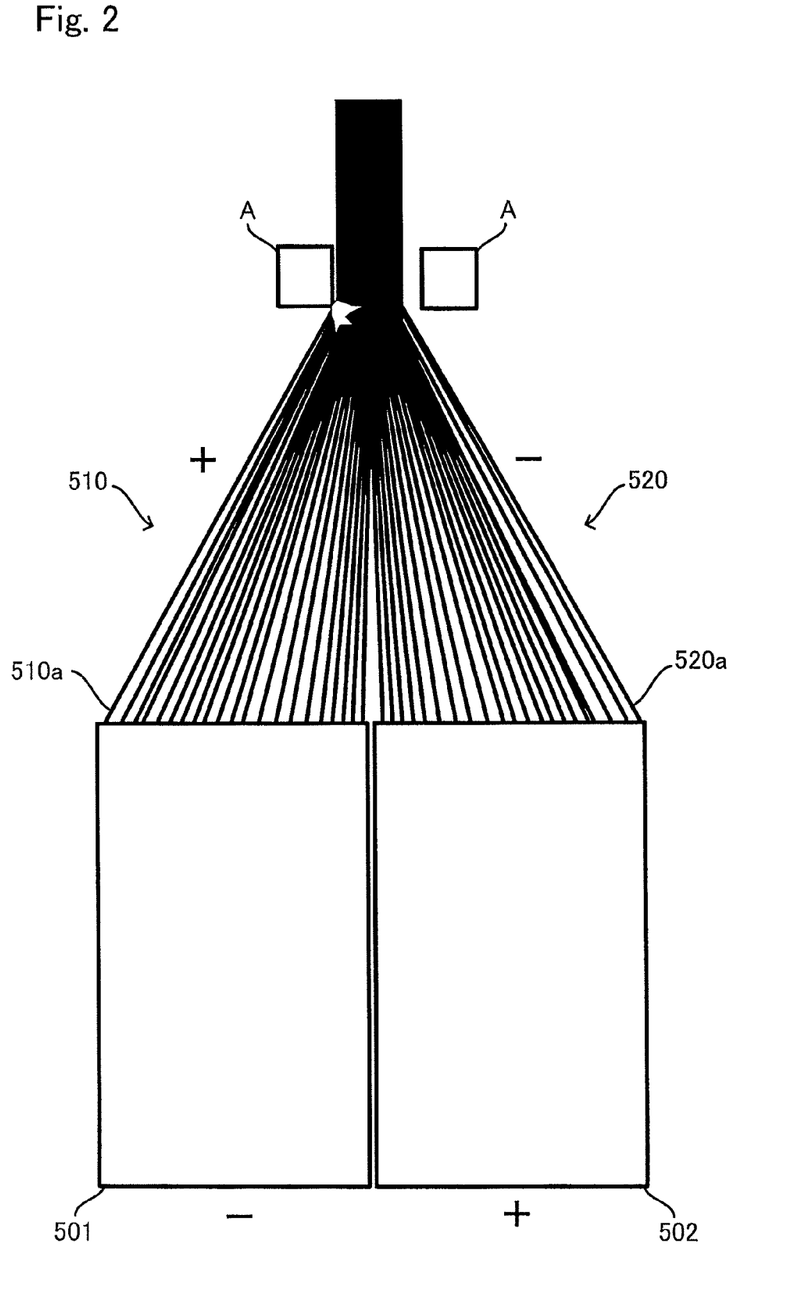
FIG. 2 is a schematic view to describe a problem of the assembled battery according to the conventional example (Comparative Example)

Also, in manufacturing the assembled battery 500, problems as below can be created. That is, as shown in FIG. 2, when a large number of unit cells are laminated in the laminated battery 501, 502, the current collectors 510a, 520a provided to the outmost of the laminated battery 501, 502 are strongly strained. In this case, if it is tried to form the connecting portion 505 by using a joining machine such as an ultrasonic joining machine and the like, by having contact with a horn or an anvil A, A, the current collectors 510a, 520a that are strained are easily ripped. To prevent ripping of the current collectors, the current collectors need to be joined at a point where the joining machine does not have contact with the current collectors. In other words, the connecting portion 505 needs to be formed at a point far from an end portion of area where active material is applied on the laminated battery 501, 502.

The present invention is to solve conventional problems as mentioned above. According to the present invention, it is possible to reduce a wasted space around the connecting portion to increase an energy density of entire assembled battery. Hereinafter, specific configurations of the present invention will be described.

2. Assembled Battery

Figure 3:
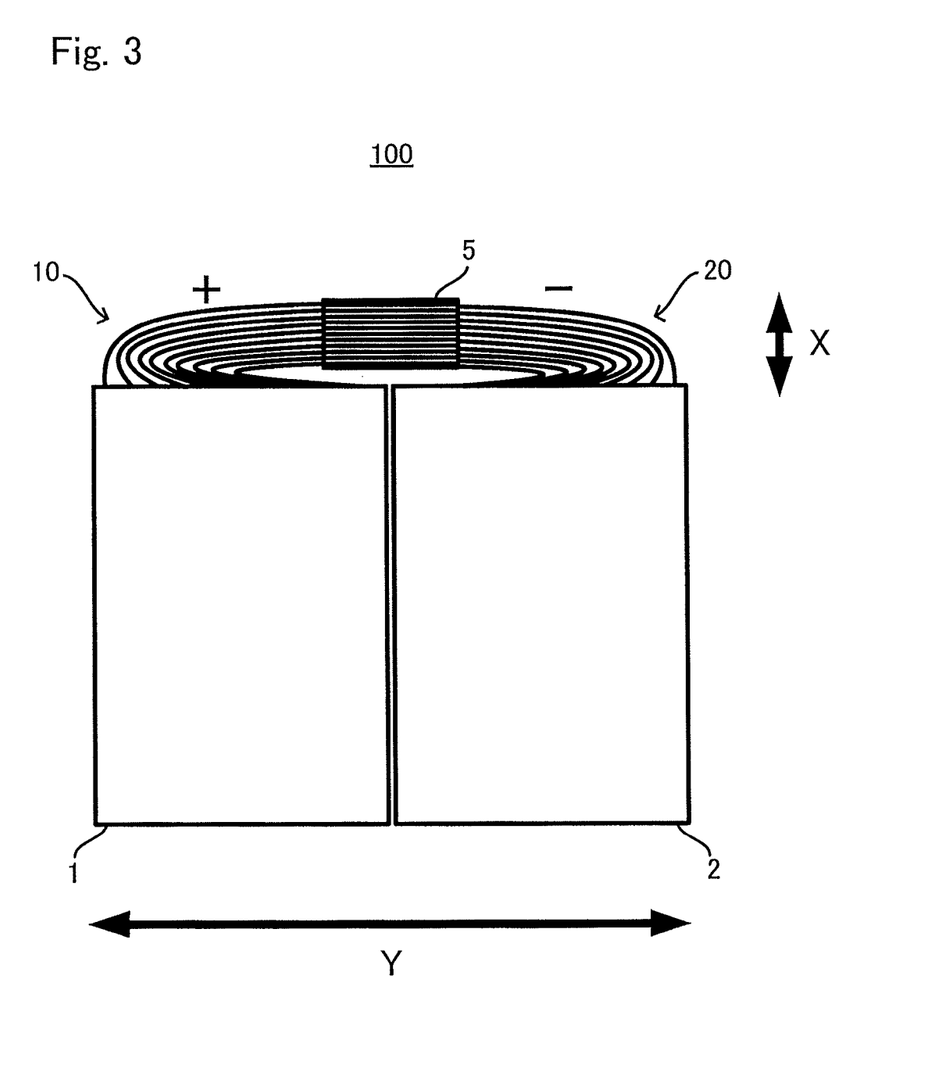
FIG. 3 is a schematic view to describe an assembled battery according to one embodiment of the present invention.

An assembled battery 100 according to one embodiment of the present invention is schematically shown in FIG. 3. As shown in FIG. 3, the assembled battery 100 comprises: a first laminated battery 1 having a plurality of current collectors 10; a second laminated battery 2 having a plurality of current collectors 20; and a connecting portion 5 to bundle and connect the plurality of current collectors 10 provided to the first laminated battery 1 and the plurality of current collectors 20 provided to the second laminated battery 2. In the assembled battery 100, the current collectors 10 are cathode current collectors, and the current collectors 20 are anode current collectors.

In the connecting portion 5 of the assembled battery 100, the plurality of current collectors 10 provided to the first laminated battery 1 and the plurality of current collectors 20 provided to the second laminated battery 2 are laminated and bundled. A lamination direction of the plurality of current collectors 10, 20 in the connecting portion 5 (direction shown by the arrow X in FIG. 3) and a lamination direction of the plurality of current collectors 10, 20 in the laminated batteries 1, 2 (direction shown by the arrow Y in FIG. 3) are different from each other, in other words, intersecting with one another. In particular, in the assembled battery 100 shown in FIG. 3, the lamination direction X of the plurality of current collectors 10, 20 in the connecting portion 5 and the lamination direction Y of the plurality of current collectors 10, 20 in the laminated batteries 1, 2 are substantially intersecting at right angles to each other.

In the assembled battery 100, the plurality of current collectors 10 provided to the first laminated battery 1 is bent from the first laminated battery 1 to the connecting portion 5. In particular, a current collector of the plurality of current collectors 10 located more inside (located on a side of the second laminated battery 2) is warped tighter than others. The current collector located inside is bent toward outside of the first laminated body, then further bent back to inside to be connected to the connecting portion 5. The plurality of current collectors 20 provided to the second laminated battery 2 are configured in the same way. The plurality of current collectors 20 are bent from the second laminated battery 2 to the connecting portion 5 of the current collectors 20, and in particular, a current collector of the plurality of current collectors 20 located more inside (on a side of the first laminated battery 1) is warped tighter than others.

Figure 4:
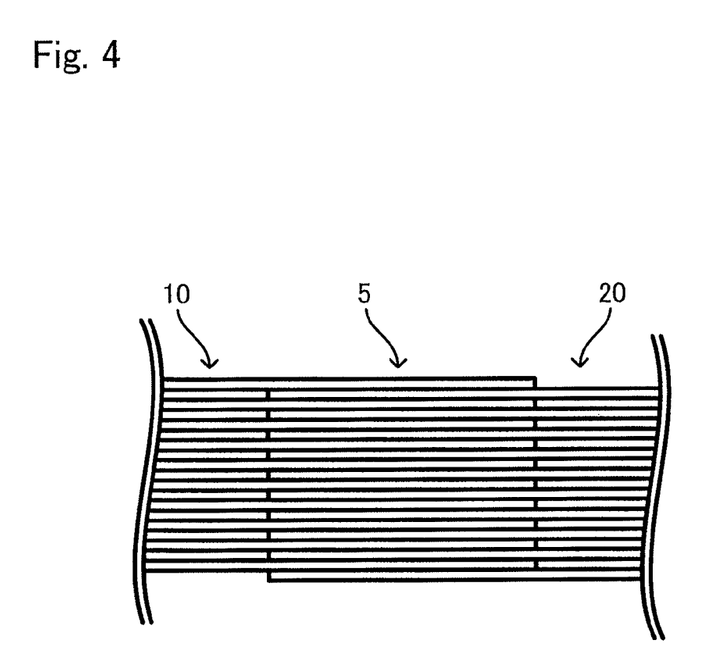
FIG. 4 is a schematic view to describe one example of laminating configuration of current collectors in a connecting portion.

In the connecting portion 5 of the assembled battery 100, the current collectors 10 provided to the first laminated battery 1 and the current collectors 20 provided to the second laminated battery 2 are preferably laminated alternately as shown in FIG. 4. The current collectors 10, 20 may be configured such that they are laminated alternately one by one, or may be configured such that every two or more of the current collectors 10, 20 are laminated alternately. By laminating the current collectors 10, 20 alternately, it is possible to strongly join them when an ultrasonic joining for example is applied.

As described above, in the assembled battery 100, when the plurality of current collectors 10 provided to the first laminated battery 1 and the plurality of current collectors 20 provided to the second laminated battery 2 are bundled and connected in series, they are laminated and bundled such that the lamination direction of the current collectors 10, 20 in the connecting portion 5 differs from the lamination direction of the current collectors 10, 20 in the laminated batteries 1, 2 (that is, a lamination direction of unit cells). This makes it possible to provide the connecting portion 5 close to an end portion of area where active material is applied on the laminated battery 1, 2. Therefore, it is possible to reduce the wasted space around the connecting portion to thereby provide an assembled battery with a large energy density.

3. Manufacturing Method of Assembled Battery

Manufacturing method of the assembled battery according to the present invention is to bundle and connect in series the plurality of current collectors provided to the first laminated battery and the plurality of current collectors provided to the second laminated battery such that the lamination direction of the plurality of current collectors provided to the first laminated battery and the plurality of current collectors provided to the second laminated battery intersects with the lamination direction of the current collectors in each laminated battery.

In particular, the method preferably comprises: a connecting step to laminate and bundle to connect in series the plurality of current collectors provided to the first laminated battery and the plurality of current collectors provided to the second laminated battery to thereby make a connecting portion; and an assembling step to assemble the first and second batteries such that the lamination direction of the plurality of current collectors in the connecting portion and the lamination direction of the plurality of current collectors in the laminated batteries are intersecting with each other. Hereinafter, a manufacturing method of the assembled battery 100 according to one embodiment of the present invention will be described with reference to FIG. 5.

Figure 5A:
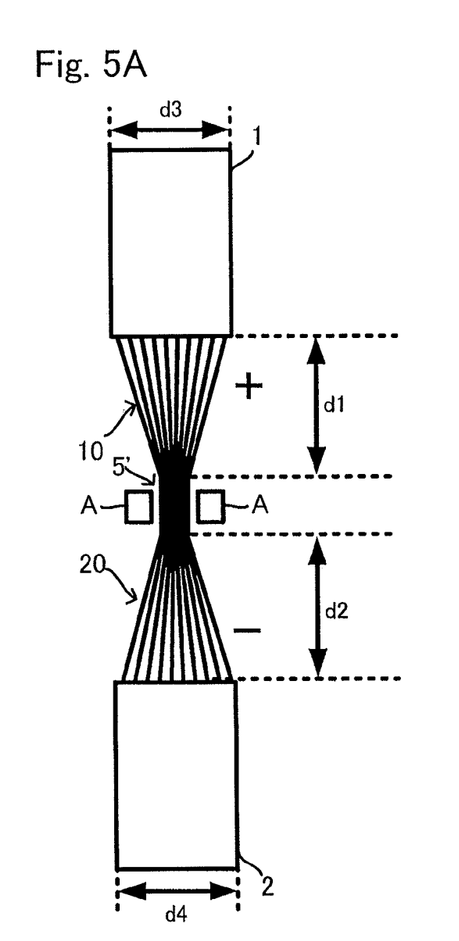
FIG. 5 is a schematic view to describe a manufacturing step of the assembled battery according to one embodiment of the present invention.

In the connecting step, for example, as shown in FIG. 5A, the first laminated battery 1 and the second laminated battery 2 are disposed to be faced to each other, then in between the first laminated battery 1 and the second laminated battery 2, a laminated portion 5' is formed by laminating alternately the plurality of current collectors 10 (cathode current collectors) and the plurality of current collectors 20 (anode current collectors). Then by inserting the laminated portion 5' in a joining machine A, A of an ultrasonic joining machine or the like to thereby join the laminated portion 5', the connecting portion 5 is formed as shown in FIG. 5B.

Here, a length d1, d2 from an end portion of area where an active material is applied on each laminated battery 1, 2 to the connecting portion 5 is not limited as long as the assembled battery 100 can be adequately manufactured. In particular, by making the length d1, d2 larger than a laminated length d3, d4 of the laminated battery 1, 2, the assembling step described below can be efficiently carried out. It should be noted that the length d1, d2 does not have to be short. In the present invention, the length d1, d2 is made to be short since it is possible to bring the connecting portion 5 efficiently closer to the end portion of area where an active material is applied on each laminated battery 1, 2. If the length d1, d2 is too short, when the assembling step is carried out, a current collector of the plurality of current collectors located outside is strongly strained, then it is concerned that the current corrector is ripped and so on.

Figure 5B:
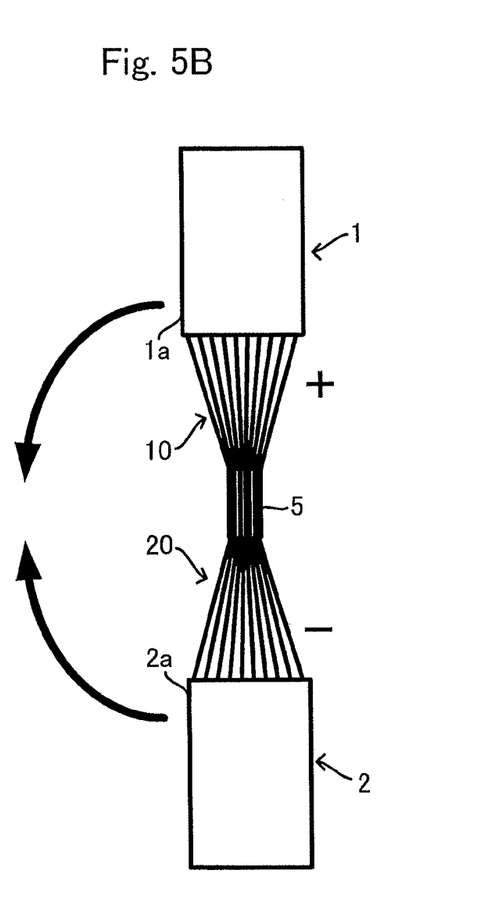

In the assembling step, the laminated batteries 1, 2, connected to each other in series by the connecting portion 5, are disposed so as to face to each other in a direction shown by the arrows in FIG. 5B. More specifically, the laminated batteries are disposed with the current collectors 10, 20 being bent and warped such that a side face 1a of the first laminated battery is adjacent to a side face 2a of the second laminated battery. Because of this, the lamination direction of the plurality of current collectors 10, 20 in the connecting portion 5 and the lamination direction of the plurality of current collectors 10, 20 in the laminated batteries 1, 2 are intersecting with each other, and it is possible to easily manufacture the assembled battery 100 with a state in which a current collector located more inside is warped tighter than others in the laminated batteries 1, 2.

4. Another Embodiment

Figure 6:
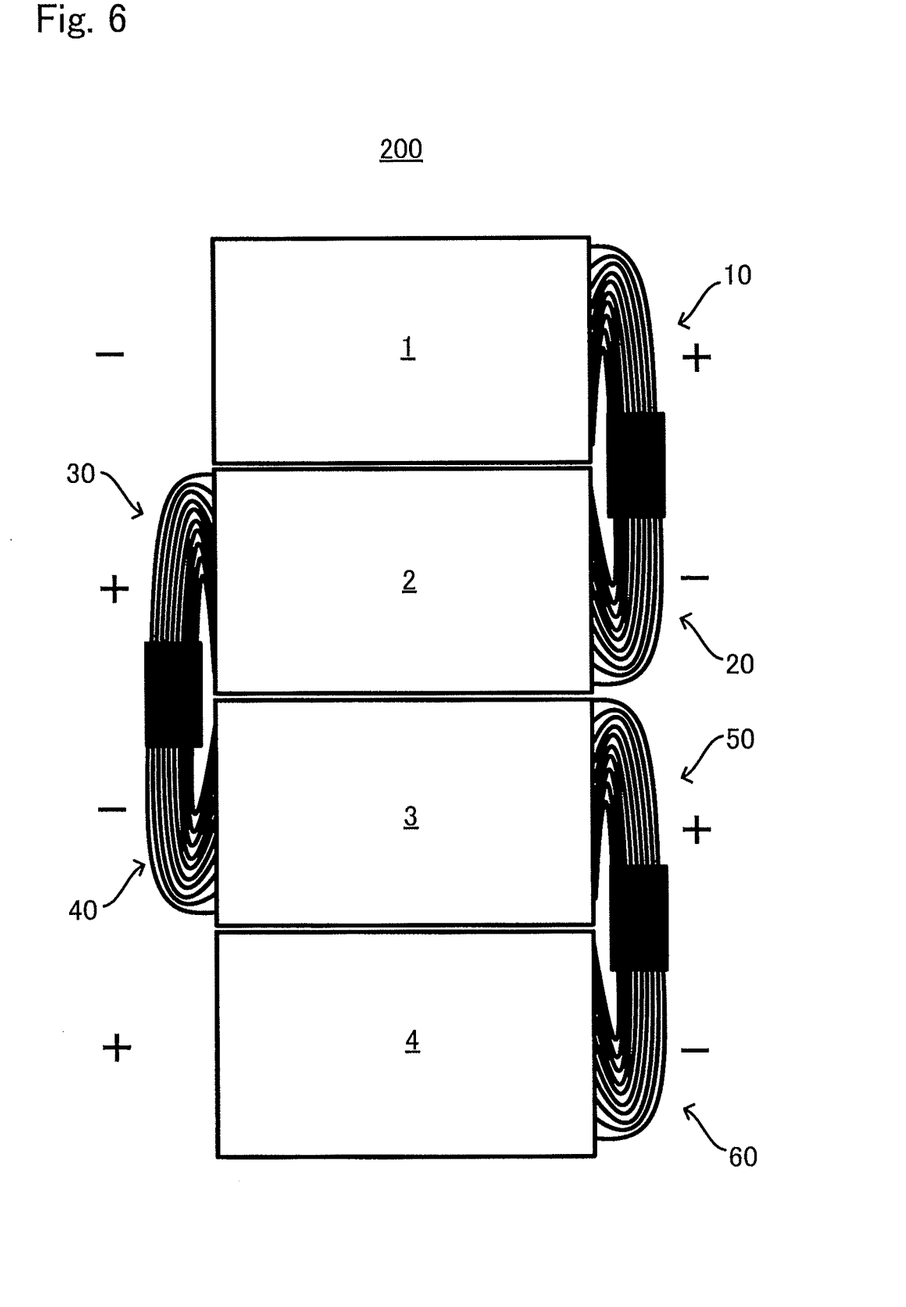
FIG. 6 is a schematic view to describe an assembled battery according to another embodiment of the present invention.
Figure 7:
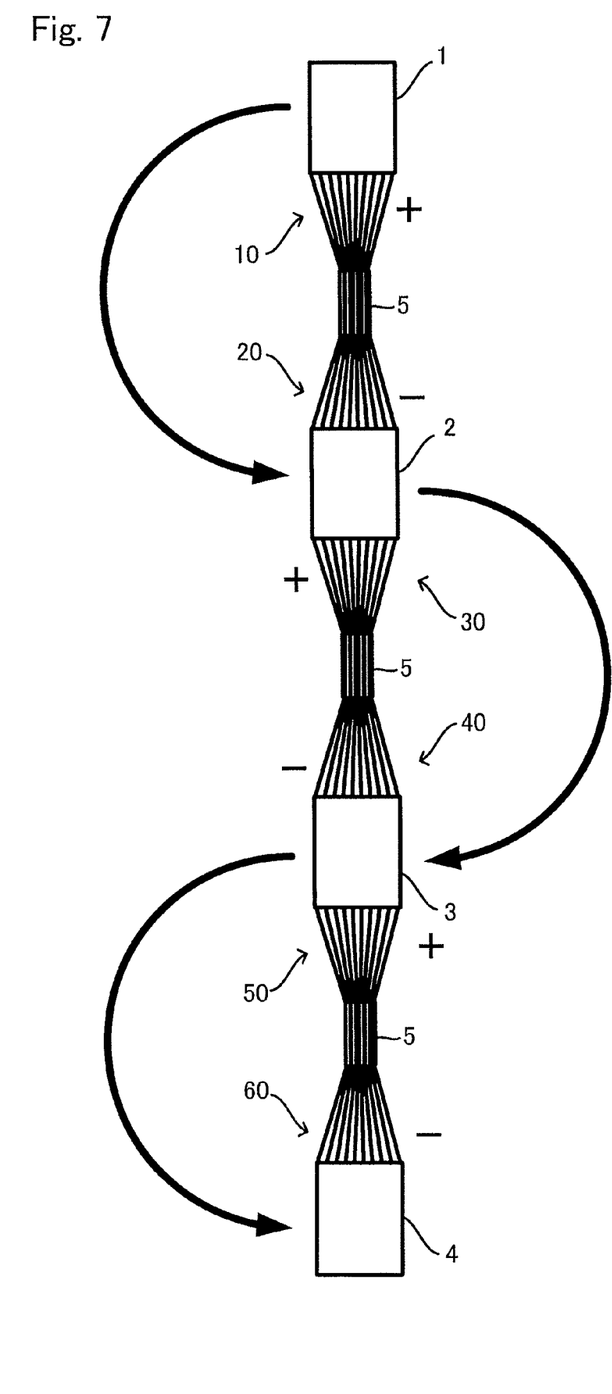
FIG. 7 is a schematic view to describe a manufacturing step of the assembled battery according to another embodiment of the present invention.

An assembled battery 200 according to another embodiment is schematically shown in FIG. 6. As shown in FIG. 6, in the assembled battery 200, the first laminated battery 1, the second laminated battery 2, a third laminated battery 3 and a fourth laminated battery 4 are connected in series in the order mentioned. More specifically, a plurality of current collectors 10 to 60 provided to the laminated batteries 1 to 4 are laminated and joined with their adjacent current collectors where they are to be connected whereby form the connecting portion 5, 5, 5. Also, a lamination direction of the plurality of current collectors 10 to 60 in the connecting portion 5, 5, 5 and a lamination direction of the plurality of current collectors 10 to 60 in the laminated batteries 1 to 4 (lamination direction of unit cells) are different to each other, in other words, intersecting with each other. As described above, in the assembled battery according to the present invention, it is possible to arbitrarily increase the number of laminated batteries to be used, and in each connecting portion thereof, it is possible to reduce a wasted space around the connecting portion. Therefore, it is possible to make an assembled battery with a high capacity and a high energy density. The assembled battery 200 like this can be easily manufactured by, for example, as shown in FIG. 7, connecting in series the laminated batteries 1 to 4 on a line, to assemble them in directions shown by arrows in FIG. 7 such that, in each of the laminated batteries, one side of each battery is adjacent to one adjacent laminated battery, and the other side of each battery is adjacent to another adjacent laminated battery.

5. Laminated Battery, Unit Cell

In the assembled battery shown above, type of the laminated battery to be used is not particularly limited. For example, an all-solid battery or polymer electrolyte battery is preferably used. Alternatively, a battery having an electrolyte solution can be used. However, when the battery having an electrolyte solution is used, a structure to prevent leaking of the solution and the like is additionally needed.

5.1. Unit Cell

Figure 8:
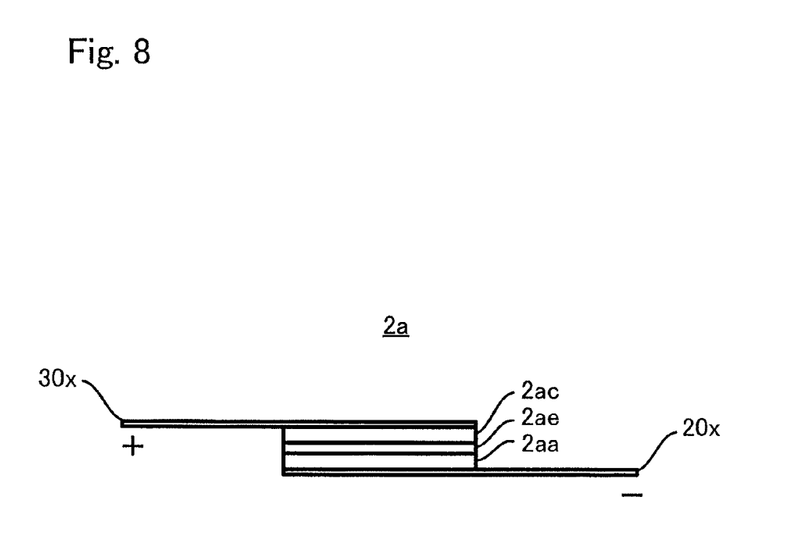
FIG. 8 is a schematic view showing one example of a unit cell that configures a laminated battery.

A unit cell 2a is shown in FIG. 8, as an example of a unit cell to configure the laminated battery. The unit cell 2a comprises: a cathode layer 2ac; an anode layer 2aa; and an electrolyte layer 2ae provided between the cathode layer 2ac and the anode layer 2aa. A cathode current collector 30x is provided in a manner to have contact with the cathode layer 2ac, and an anode current collector 20x is provided in a manner to have contact with the anode layer 2aa. The unit cell 2a can be used, for example, as a unit cell in the second laminated battery 2 in FIG. 6. Hereinafter, a configuration in which the unit cell 2a is an all-solid lithium cell will be described. However, the present invention is not limited to this configuration, and the unit cell 2a can be a sodium cell, potassium cell, Lithium-air cell or the like. However, in view of manufacturing an assembled battery easily and with high safety, to obtain the assembled battery with a larger energy density, it is preferable to use an all-solid lithium cell or a polymer electrolyte cell as the unit cell.

5.1.1. Cathode Layer, Anode Layer

The cathode layer 2ac and the anode layer 2aa comprised to the unit cell 2a are layers each include an active material and an electrolyte, and arbitrarily include a conductive assistant and a binding agent. When the unit cell 2a is an all-solid lithium cell, as the active material, $LiCoO_2$, $LiNiO_2$, Li—Mn spinel substituted with a different kind of element shown by $Li_{1+x}Ni_{1/3}Mn_{1/3}Co_{1/3}O_2$, $LiMn_2O_4$, or $Li_{1+x}Mn_{2-x-y}M_yO_4$ (M is one selected from the group consisting of Al, Mg, Co, Fe, Ni, and Zn), $Li_xTiO_y$, $LiMPO_4$ (M is one selected from the group consisting of Fe, Mn, Co, and Ni), $V_2O_5$, $MoO_3$, $TiS_2$, a carbon material such as graphite, hard carbon or the like, LiCoN, LixSiyOz, lithium metal or lithium alloy (LiM, M is one selected from the group consisting of Sn, Si, Al, Ge, Sb, P and the like), a lithium storage intermetallic compound ($Mg_xM$ (M is one selected from the group consisting of Sn, Ge, Sb), or $N_ySb$ (N is one selected from the group consisting of In, Cu, and Mn)), a derivative thereof or the like can be used. Here, there is no clear distinction between the cathode active material and the anode active material, and by comparing charging/discharging potential of two kinds of compounds to use the compound that shows a higher potential for the cathode layer 2ac, the compound that shows a lower potential for the anode layer 2aa, it is possible to configure the unit cell 2a having an arbitrary voltage.

Also, when the unit cell 2a is an all-solid lithium cell, as the electrolyte, a solid electrolyte is used. Specifically, an oxide-based amorphous solid electrolyte such as $Li_2O$—$B_2O_3$—$P_2O_5$, $Li_2O$—$SiO_2$, $Li_2O$—$B_2O_3$—ZnO or the like, a sulfide-based amorphous solid electrolyte such as $Li_2S$—$SiS_2$, LiI—$Li_2S$—$SiS_2$, LiI—$Li_2S$—$P_2S_5$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, LiI—$Li_2S$—$P_2O_5$, LiI—$Li_3PO_4$—$P_2S_5$, $Li_2S$—$P_2S_5$ or the like, or, LiI, LiI—$Al_2O_3$, $Li_3N$, $Li_3N$—LiI—LiOH or the like, a crystalline oxide or crystalline oxynitride such as $Li_{1.3}Al_{0.3}Ti_{0.7}(PO_4)_3$, $Li_{1+x+y}A_xTi_{2-x}Si_yP_{3-y}O_{12}$ (A is Al or Ga, $0 \leq x \leq 4$, $0 < y \leq 0.6$), $[(B_{1/2}Li_{1/2})_{1-z}C_z]TiO_3$ (B is one selected from the group consisting of La, Pr, Nd, and Sm, C is one selected from the group consisting of Sr and Ba, $0 \leq z \leq 0.5$), $Li_5La_3Ta_2O_{12}$, $Li_7La_3Zr_2O_{12}$, $Li_6BaLa_2Ta_2O_{12}$, $Li_3PO_{(4-3/2w)}Nw$ (w<1), $Li_{3.6}Si_{0.6}P_{0.4}O_4$ or the like can be used.

As the conductive assistant, a conventional conductive assistant can be used without particular limitation. For example, it is preferable to use a carbon material such as acetylene black and or the like. As the binding agent, a conventional binding agent can be used without particular limitation, For example, it is preferable to use a fluoroethylene resin such as polyvinylidene fluoride or the like, or a resin having rubber property such as styrene-butadiene rubber (SBR) or the like.

Mixing ratio of materials to be included in the cathode layer 2ac and the anode layer 2aa are not particularly limited as long as the unit cell 2a can properly operate with the mixing ratio. For example, by mass ratio, the materials can be mixed with the mixing ratio of active material:electrolyte:conducting assistant:binding agent=99~40:1~50:0~5:0~5. Also, each thickness, shape and the like of the cathode layer 2ac and the anode layer 2aa are not particularly limited as long as the cathode layer 2ac and the anode layer 2aa are adequately formed on the cathode current collector 30x and the anode current collector 20x that are described below. For example, each thickness of the cathode layer 2ac and the anode layer 2aa can be about 5~500 μm. The cathode layer 2ac and the anode layer 2aa can be formed and produced by applying a paste that includes the above active material and the like by a doctor blade and the like to the cathode current collector 30x and the anode current collector 20x and drying the paste. Alternatively, the cathode layer 2ac and the anode layer 2aa can be formed and produced by carrying out press forming to powder of the above active material and the like.

5.1.2 Electrolyte Layer

The electrolyte layer 2ae is a layer that includes an electrolyte. When the unit cell 2a is an all-solid lithium cell, the electrolyte layer 2ae includes a solid electrolyte and arbitrarily includes a binding agent and the like. As the solid electrolyte, the above-described solid electrolyte can be used. As the binding agent as well, the above-described binding agent can be used.

Mixing ratio of materials to be included in the electrolyte layer 2ae is not particularly limited as long as the unit cell 2a can properly operate with the mixing ratio. For example, by mass ratio, the materials can be mixed with the mixing ratio of electrolyte:binding agent=100~70:0~30. Also, thickness, shape and the like of the electrolyte layer 2ae are not particularly limited as long as the electrolyte layer 2ae is configured to be adequately disposed between the cathode layer 2ac and the anode layer 2aa to contribute to ion conduction between the cathode layer 2ac and the anode layer 2aa. For example, the thickness of the electrolyte layer 2ae can be around 0.1~500 μm. The electrolyte layer 2ae can be formed and produced by applying a paste that includes the above electrolyte and the like by a doctor blade and the like to the cathode layer 2ac or the anode layer 2aa and dry the paste. Alternatively, the electrolyte layer 2ae can be formed and produced by carrying out press forming to powder of the above solid electrolyte and the like.

5.1.3. Cathode Current Collector, Anode Current Collector

When the unit cell 2a is an all-solid lithium cell, each material and the like of the cathode current collector 30x and the anode current collector 20x are not particularly limited as long as the cathode current collector 30x and the anode current collector 20x can be applied to the all-solid lithium cell. For example, a metal foil, a metal mesh, a metal vapor-deposited film and the like can be used. Specifically, a metal film or a metal mesh of metal selected from the group consisting of Cu, Ni, Al, V, Au, Pt, Mg, Fe, Ti, Co, Zn, Ge, In, stainless steel and the like, or, a metal vapor-deposited film in which metal selected from the above group is vapor-deposited onto the surface of a film such as polyamide, polyimide, PET, PPS, polypropylene or the like, glass, a silicon plate and the like. The thickness of each of the cathode current collector 30x and the anode current collector 20x is not particularly limited. For example, the thickness can be about 5~500 μm. A size of each of the cathode current collector 30x and the anode current collector 20x is not particularly limited as long as the cathode current collector and the anode current collector can be bundled after a laminated battery is made.

The unit cell 2a is not particularly limited as long the unit cell 2a comprises above-mentioned the cathode layer 2ac, the electrolyte layer 2ae, the anode layer 2aa, the cathode current collector 30x and the anode current collector 20x, and the unit cell 2a can be a monopolar cell or a bipolar cell.

5.2. Laminated Battery

Figure 9:
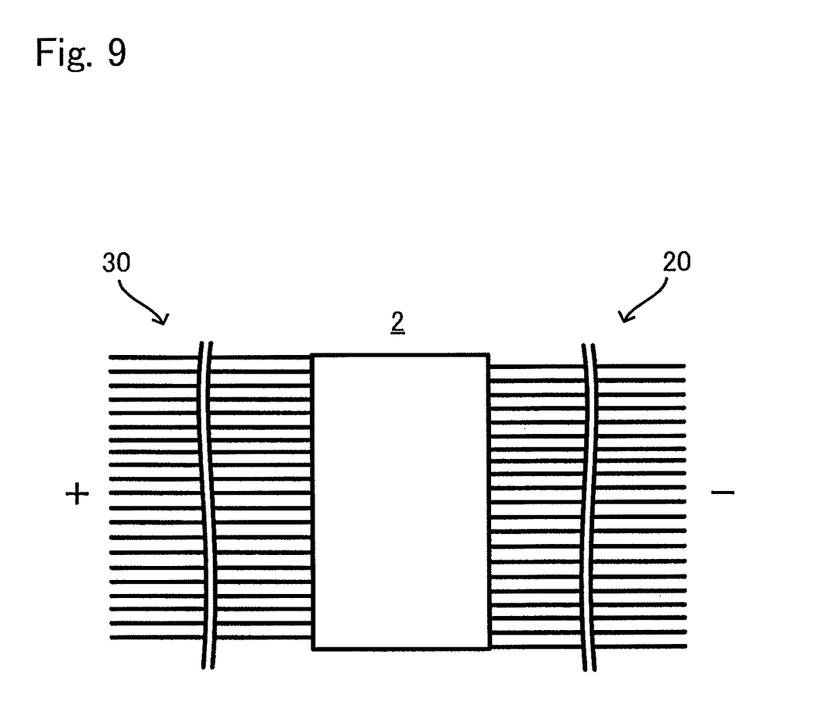
FIG. 9 is a schematic view showing one example of the laminated battery.

A laminated battery 2 in which a unit cells 2a mentioned above is laminated more than once is schematically shown in FIG. 9. The laminated battery 2 can be used as the second laminated battery 2 in FIG. 6. As shown in FIG. 9, the laminated battery 2 in which the plurality of single cells 2a, 2a are laminated is housed in a housing. A plurality of cathode current collectors 30 (30x, 30x, . . . ) of the laminated battery 2 are extended from one side of the housing, and a plurality of anode current collectors 20 (20x, 20x, . . . ) of the laminated battery 2 are extended from the other side of the housing. An assembled battery can be configured by: preparing two or more of such laminated batteries; laminating and joining current collectors of one of the laminated batteries to other current collectors of rest of the laminated batteries; and connecting the laminated batteries in series.

The assembled battery according to the present invention has been described as above. However, the present invention is not limited to the specific configurations described above.

For example, in the above description, a configuration in which the lamination direction of the plurality of current collectors 10, 20 in the connecting portion 5 and the lamination direction of the plurality of current collectors 10, 20 in the laminated batteries 1, 2 (lamination direction of unit cells) are substantially intersecting at right angled to each other. However, the present invention is not limited to this configuration. As long as a lamination direction of a plurality of current collectors in a connecting portion and a lamination direction of the plurality of current collectors in a laminated battery are intersecting with each other, it is possible to reduce a wasted space around the connecting portion.

Also, in the above description, it has been described that a current collector of the plurality of current collectors located more inside (located on a side of another laminated battery) is warped tighter than others. However, the present invention is not limited to this configuration. By adequately adjusting lengths of the current collectors, it is possible to reduce degree of warp of the current collectors 10, 20 between the laminated batteries 1, 2 and the connecting portion 5. However, as mentioned above, the assembled battery 100 according to the present invention can provide the connecting portion 5 close to the end portion of area where active material is applied on the laminated battery 1, 2, without reducing the degree of warp.

Also, in the above description, in manufacturing the assembled battery, it has been described that the connecting step is followed by the assembling step. However, the present invention is not limited to this configuration. For example, after installing the laminated batteries 1, 2 to desired positions in the assembled battery 100, the current collectors 10, 20 can be laminated and joined while being bent, to thereby form the connecting portion 5.

Also, in the assembled battery described above, the assembled battery is configured such that a plurality of laminated batteries are connected to one another in series. However, the present invention is not limited to this configuration. The present invention can be configured such that the plurality of laminated batteries are connected to one another in parallel. However, in view of making a high-powered assembled battery, the assembled battery is preferably configured such that the plurality of laminated batteries are connected to one another in series.

Also, having a same effect as that of the assembled battery described above, the following assembled battery can be included in the present invention. Namely, an assembled battery comprising a first laminated battery in which a current collector(s) is/are laminated more than once; a second laminated battery in which a current collector(s) is/are laminated more than once; and a connecting portion that bundles to connect the current collector(s) of the first laminated battery and the current collector(s) of the second laminated battery, wherein the current collector(s) of the first laminated battery and the current collector(s) of the second laminated battery are bundled to be connected in the connecting portion, and a laminated direction of the current collector(s) in the connecting portion and a laminated direction of the current collector(s) in the first laminated battery and the second laminated battery are intersecting with each other. The assembled battery can have a large energy density. The term "laminated battery in which a current collector(s) is/are laminated more than once" refers a laminated battery in which a current collector(s) is/are laminated more than once with a cathode layer and the like. This includes a configuration in which one unit cell is wound whereby a current collector(s) is/are laminated more than once with a cathode layer and the like in a cross-sectional shape. That is, "a wound battery" is included to the "laminated battery" in the present invention.

In this case, when a current collector(s) extending from a first wound battery and a current collector(S) extending from a second wound battery are bundled to configure a connecting portion, a lamination direction of the current collector(s) in the connecting portion and a lamination direction of the current collector(s) in the laminated battery are intersecting with each other.

EXAMPLES

Hereinafter, based on the Examples, the assembled battery according to the present invention will be described more specifically. However, the present invention is not limited to the following specific configurations.

A laminated battery was produced by laminating a lithium all-solid unit cell to have fifty nine layers. A plurality of the laminated batteries were used to make an assembled battery.

Example

By using an ultrasonic joining machine, the assembled battery 100 as shown in FIG. 3 was made. The distance from the end portion of area where active material is applied to the connecting portion 5 was measured and confirmed that it was possible to make the distance from the end portion of area where active material is applied to the connecting portion 5 closer as 10 mm or less. The assembled battery was able to be made stably without causing ripping of the current collectors and the like.

Comparative Example

The assembled battery 500 as shown in FIG. 1 was produced by using an ultrasonic joining machine. The distance from the end portion of area where active material is applied to the connecting portion 505 was measured and the current collector 510a, 520a were checked whether they were ripped or not. Then it was found that the distance with which the assembled battery can be produced without causing ripping of the current collectors was about 20 mm. When the connecting portion 505 was made further closer to the end portion of area where active material is applied, the current collectors 510a, 520a were ripped.

As shown above, by assembling an assembled battery such that the lamination direction of the plurality of current collectors 10, 20 in the connecting portion 5 and the lamination direction of the plurality of current collectors 10, 20 in the laminated batteries 1, 2 are intersecting with each other, it was possible to reduce the distance from the end portion of area where active material is applied to the connecting portion 5. That is, it was proved that an assembled battery in which a wasted space around connecting portion can be reduced, the battery having a large energy density can be obtained according to the present invention.

Industrial Applicability

The assembled battery according to the present invention is configured such that a wasted space around connecting portion is reduced, and has a large energy density. Therefore the assembled battery can be preferably used as a power source for particularly mounting to a vehicle.

DESCRIPTION OF THE REFERENCE NUMERALS

1 first laminated battery
2 second laminated battery
2a unit cell
2ac cathode layer
2ae electrolyte layer
2aa anode layer
3 third laminated battery
4 fourth laminated battery
5 connecting portion
10 plurality of current collectors
20 plurality of current collectors
30 plurality of current collectors
40 plurality of current collectors
50 plurality of current collectors
60 plurality of current collectors

The invention claimed is:

1. An assembled battery comprising:
   a first laminated battery having a plurality of current collectors;
   a second laminated battery having a plurality of current collectors; and
   a connecting portion that bundles and connects the plurality of current collectors of the first laminated battery and the plurality of current collectors of the second laminated battery,
   wherein the plurality of current collectors provided to the first laminated battery and the plurality of current collectors provided to the second laminated battery are laminated and bundled in the connecting portion, a lamination direction of the plurality of current collectors in the connecting portion and a lamination direction of the plurality of current collectors in each laminated battery are intersecting with each other, a current collector of the plurality of current collectors provided to the first laminated battery, the current collector located closer to the second laminated battery is warped toward opposite direction of the second laminated battery at first, then toward the second laminated battery with becoming closer to the connecting portion, and a current collector of the plurality of current collectors provided to the second laminated battery, the current collector located closer to the first laminated battery is warped toward opposite direction of the first laminated battery at first, then toward the first laminated battery with becoming closer to the connecting portion.

2. The assembled battery according to claim 1,
   wherein the plurality of current collectors are bundled and connected in series in the connecting portion.

3. The assembled battery according to claim 2,
   wherein the current collectors provided to the first laminated battery and the current collectors provided to the second laminated battery are laminated alternately in the connecting portion.

4. The assembled battery according to claim 2,
   wherein the lamination direction of the plurality of current collectors in the connecting portion and the lamination direction of the plurality of current collectors in each laminated battery are substantially intersecting at right angles to each other.

5. The assembled battery according to claim 1,
wherein the current collectors provided to the first laminated battery and the current collectors provided to the second laminated battery are laminated alternately in the connecting portion.

6. The assembled battery according to claim 5,
wherein the lamination direction of the plurality of current collectors in the connecting portion and the lamination direction of the plurality of current collectors in each laminated battery are substantially intersecting at right angles to each other.

7. The assembled battery according to claim 1,
wherein the lamination direction of the plurality of current collectors in the connecting portion and the lamination direction of the plurality of current collectors in each laminated battery are substantially intersecting at right angles to each other.

8. An assembled battery comprising:
a first laminated battery in which a current collector(s) is/are laminated more than once;
a second laminated battery in which a current collector(s) is/are laminated more than once; and
a connecting portion that bundles and connects the current collector(s) provided to the first laminated battery and the current collector(s) provided to the second laminated battery,
wherein the current collector(s) provided to the first laminated battery and the current collector(s) provided to the second laminated battery are laminated and bundled in the connecting portion, a lamination direction of the current collectors in the connecting portion and a lamination direction of the current collectors in each laminated battery are intersecting with each other, the current collector(s) provided to the first laminated battery is/are warped toward opposite direction of the second laminated battery at first, then toward the second laminated battery with becoming closer to the connecting portion, and the current collector(s) provided to the second laminated battery is/are warped toward opposite direction of the first laminated battery at first, then toward the first laminated battery with becoming closer to the connecting portion.

9. A manufacturing method of an assembled battery comprising laminating, bundling, and connecting a plurality of current collectors provided to a first laminated battery and a plurality of current collectors provided to a second laminated battery in a manner to intersect a lamination direction of the plurality of current collectors provided to the first laminated battery and the plurality of current collectors provided to the second laminated battery with a lamination direction of the plurality of current collectors in each laminated battery, and the current collectors provided to the first laminated battery are warped, from the first laminated battery, toward opposite direction of the second laminated battery at first, then toward the second laminated battery with becoming closer to the connecting portion, and the current collectors provided to the second laminated battery are warped, from the second laminated battery, toward opposite direction of the first laminated battery at first, then toward the first laminated battery with becoming closer to the connecting portion.

10. A manufacturing method of an assembled battery, the method comprising:
a connecting step to laminate, bundle, and connect in series a plurality of current collectors provided to a first laminated battery and a plurality of current collectors provided to a second laminated battery to thereby make a connecting portion;
and an assembling step to assemble the first laminated battery and the second laminated battery such that a lamination direction of the plurality of current collectors in the connecting portion and a lamination direction of the plurality of current collectors in each laminated battery are intersecting with each other, and the current collectors provided to the first laminated battery are warped, from the first laminated battery, toward opposite direction of the second laminated battery at first, then toward the second laminated battery with becoming closer to the connecting portion, and the current collectors provided to the second laminated battery are warped, from the second laminated battery, toward opposite direction of the first laminated battery at first, then toward the first laminated battery with becoming closer to the connecting portion.

11. The manufacturing method of an assembled battery according to claim 10, the method comprising, in the connecting step, laminating alternately the current collectors provided to the first laminated battery and the current collectors provided to the second laminated battery.

12. The manufacturing method according to claim 11, the method comprising, in the assembling step, intersecting the lamination direction of the plurality of current collectors in the connecting portion and the lamination direction of the plurality of current collectors in each laminated battery at right angles to each other.

13. The manufacturing method according to claim 10, the method comprising, in the assembling step, intersecting the lamination direction of the plurality of current collectors in the connecting portion and the lamination direction of the plurality of current collectors in each laminated battery at right angles to each other.

* * * * *